March 3, 1970     R. ANDRES     3,498,189
DOUBLE-ACTING PNEUMATIC SERVO-MOTOR, ESPECIALLY
ADJUSTING MOTOR FOR FLAPS OR OTHER RECIPROCATING
STRUCTURAL PARTS IN MOTOR VEHICLES
Filed March 8, 1968
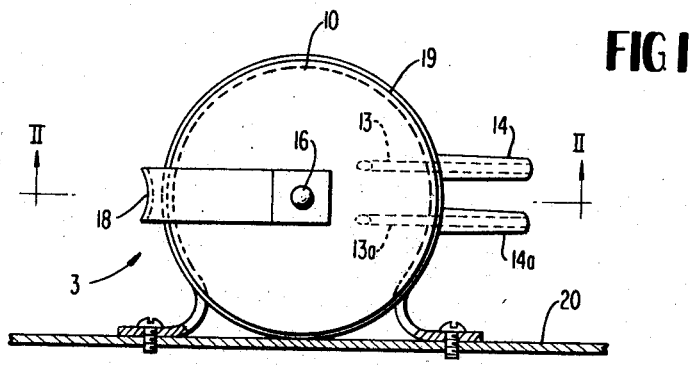
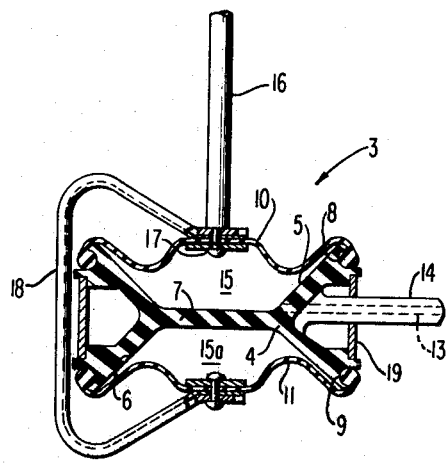
INVENTOR
RUDOLF ANDRES
BY *Craig & Antonelli*
ATTORNEYS

United States Patent Office 3,498,189
Patented Mar. 3, 1970

3,498,189
DOUBLE-ACTING PNEUMATIC SERVO-MOTOR, ESPECIALLY ADJUSTING MOTOR FOR FLAPS OR OTHER RECIPROCATING STRUCTURAL PARTS IN MOTOR VEHICLES
Rudolf Andres, Sindelfingen, Germany, assignor to Daimler-Benz Aktiengesellschaft, Stuttgart-Unterturkheim, Germany
Filed Mar. 8, 1968, Ser. No. 711,753
Claims priority, application Germany, Mar. 11, 1967, D 52,502
Int. Cl. F01b 19/00; F16j 3/00
U.S. Cl. 92—98                               9 Claims

ABSTRACT OF THE DISCLOSURE

A double-acting pneumatic servo-motor, especially an adjusting motor for dampers, flaps or other reciprocating structural parts in motor vehicles, in which one diaphragm each is arranged on each of the two sides of a bearer body to form a respective working space with the same for the pneumatic medium while a mechanical connection which connects the diaphragms with each other surrounds the bearer-body-diaphragm unit.

BACKGROUND OF THE INVENTION

The present invention relates to a double-acting servo-motor, especially to an adjusting motor for flaps, dampers or other to and fro movable structural parts in motor vehicles. Customary servo-motors of this type consist essentially of a housing, of a diaphragm arranged centrally in the housing and separating the two work spaces for the pneumatic medium and of an operating rod secured at the diaphragm and extending through the housing. The completely satisfactory sealing at the places of passage between the operating rod and the housing offers difficulties. For example, with the use of the usual sealing means, such as, grease chambers and the like, difficulties and friction losses occur frequently, and leaks frequently are not completely avoided nevertheless.

SUMMARY OF THE INVENTION

The present invention is intended to obviate these disadvantages. It is proposed according to the present invention that to both sides of a central bearer body, one diaphragm each is arranged forming with the bearer body a respective working space for the pneumatic medium, which diaphragms are mechanically connected with each other by surrounding the bearer-body-diaphragm unit, whereby both diaphragms may be connected with each other by a bracket or clamp. The operating rod may engage at this clamp.

A disk-shaped construction with approximately X-shaped cross section is proposed according to the present invention for the bearer body whereby the diaphragms may be snapped-in into grooves of the leg portions of the X-shaped bearer body. The bearer body may also be secured with the aid of a securing strap surrounding the same or by means of screws, particularly self-tapping screws in the case of a bearer body made from synthetic resinous material.

Accordingly, it is an object of the present invention to provide a double-acting pneumatic servo-motor of the type described above which is simple in construction and effectively eliminates the aforementioned shortcomings and drawbacks encountered in the prior art.

Another object of the present invention resides in the provision of a double-acting pneumatic servo-motor which permits the attainment of a simple and completely satisfactory sealing at the passages between the operating rod and the housing.

A further object of the present invention resides in a double-acting pneumatic servo-motor which avoids friction losses and at the same time assures operating ease of the movable parts.

These and further objects, features and advantages of the present invention will become more obvious from the following description when taken in connection with the accompanying drawing which shows, for purposes of illustration only, one embodiment in accordance with the present invention, and wherein:

FIGURE 1 is a plan view on a servo-motor according to the present invention at a motor vehicle with two connecting nipples for the air lines; and FIGURE 2 is a cross-sectional view taken along line II—II of FIGURE 1.

Referring now to the drawing wherein like reference numerals are used throughout the two views to designate like parts, reference numeral 3 generally designates therein the adjusting motor operating with a vacuum which comprises a rigid, circularly shaped bearer body 4 made of synthetic resinous material and being of approximately X-shaped construction in cross section. The bearer body is covered off by two diaphragms 10 and 11 whereby a working space 15 and 15a for the pneumatic medium results on each side of the bearer body 4. The diaphragms 10 and 11 are alternately inflated and depressed by the externally introduced changes of the pressure in the two working spaces. The bearer body 4 is provided intermediate the two annularly shaped parts 5 and 6 corresponding to the legs of the X-shaped cross section, with a flat disk-shaped web portion 7. The diaphragms 10 and 11 which are provided with bead-like rim portions are snapped into the grooves 8 and 9 where they are held in a conventional manner.

The working spaces 15 and 15a are opened toward the outside by way of a respective bore 13 and 13a, respectively. The vacuum lines are connected with the connecting nipples 14 and 14a.

The one diaphragm 10 is securely connected in its center with an operating rod 16. Additionally, an approximately U-shaped bracket or clamp 18 is secured at the securing place 17 of the operating rod 16 on the diaphragm 10. The bracket or clamp 18 surrounds one-half of the adjusting motor 3 and is also securely connected with the other diaphragm 11.

Upon withdrawal of air from the chamber 15 by way of the connecting nipple 14, whereby the latter may be connected, for example, with the intake elbow of the motor vehicle engine, the diaphragm 10 together with the operating rod 16 is pulled down in the direction toward the center web portion 7 of the bearer body 4 by the suction effect. The diaphragm 11 on the other side of the bearer body 4, in contrast thereto, is forcibly pressed outwardly by the clamp or bracket 18. The nipple 14a is thereby opened toward the atmospheric air.

If now the coordination of the nipples 14 and 14a to the vacuum source and atmospheric air is interchanged, then during the inward movement of the diaphragm 11, the operating rod 16 is pressed outwardly under the effect of the clamp or bracket 18.

The bearer body 4 together with the two diaphragms 10 and 11 is enclosed by a retaining strap 19 surrounding the same, with the aid of which the adjusting motor 3 is secured at a motor vehicle, i.e., at a structural part 20 thereof. The retaining strap 19 forms a flat base surface with bores therethrough for the accommodation of conventional connecting means such as, for example, self-tapping threaded screws.

With such a construction of the adjusting motor, a maximum possible utilization of the introduced vacuum energy is possible for exerting a displacement force without friction losses or sealing losses.

While I have shown and described only one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A double-acting pneumatic servo-motor, especially an adjusting motor for flaps or other to and fro moving structural parts in motor vehicles, wherein the improvement comprises bearer body means arranged centrally, diaphragm means arranged on each side of the bearer body means to form a respective working space for the pneumatic medium, mechanical connecting means connecting the diaphragm means with each other by surrounding the bearer-body-diaphragm unit wherein the end portions of said mechanical connecting means are secured to said diaphragm by clamp means secured substantially at the center of the diaphragm means, and operating rod means engaging at the mechanical connecting means substantially in the center of one diaphragm means.

2. A servo-motor according to claim 1, wherein said bearer body means is of essentially disk-like shape and has an approximately X-shaped cross section, said diaphragm means being retained with bulge-like edge portions in grooves accommodated in the leg portions of the X-shaped bearer body means, strap means being provided with a flat base surface and bores for the accommodation of threaded means for the fastening of the servo-motor, wherein said bearer body means is made from synthetic resinous material and the threaded means are self-tapping screws.

3. A servo-motor according to claim 2, wherein said strap means surrounds the bearer body means while covering an approximately V-shaped annular groove formed by the leg portion of the X-shaped bearer body means.

4. A servo-motor according to claim 1, wherein said bearer body means is of essentially disk-like shape and has an approximately X-shaped cross section.

5. A servo-motor according to claim 4, wherein the diaphragm means are retained with bulge-like edge portions in grooves accommodated in the leg portions of the X-shaped bearer body means.

6. A servo-motor according to claim 4, further comprising retaining strap means surrounding the bearer body means while covering an approximately V-shaped annular groove formed by the leg portion of the X-shaped bearer body means.

7. A servo-motor according to claim 1, wherein a strap means is provided with a flat base surface and bores for the accommodation of threaded means for the fastening of the servo-motor.

8. A servo-motor according to claim 7, wherein the bearer body means is made from synthetic resinous material and the threaded means are self-tapping screws.

9. A servo-motor according to claim 6, wherein the diaphrabm means are retained with bulge-like edge portions in grooves accommodated in the leg portions of the X-shaped bearer body means.

References Cited

UNITED STATES PATENTS

| | | | |
|---|---|---|---|
| 2,061,898 | 11/1936 | De Motte | 92—48 XR |
| 2,649,843 | 8/1953 | Province | 92—48 |
| 2,671,470 | 3/1954 | Boteler | 92—48 |
| 2,753,882 | 7/1956 | Bottoms | 92—49 |
| 2,969,776 | 1/1961 | Riester | 92—48 |
| 2,976,085 | 3/1961 | Grogan | 92—48 XR |
| 3,218,593 | 11/1965 | Jonke | 92—48 XR |
| 3,289,547 | 12/1966 | Kytta | 92—48 XR |
| 3,395,620 | 8/1966 | Schmoeger | 92—161 |
| 3,408,899 | 11/1968 | Golden | 92—99 XR |

FOREIGN PATENTS 631,186 10/1949 Great Britain.

MARTIN P. SCHWADRON, Primary Examiner

L. J. PAYNE, Assistant Examiner

U.S. Cl. X.R.

92—48, 99